United States Patent [19]
Schulz

[11] 4,159,148
[45] Jun. 26, 1979

[54] FOLDING ARM REST ACCESSORY
[76] Inventor: Terry H. Schulz, 1632 E. Maryland, Phoenix, Ariz. 85016
[21] Appl. No.: 872,822
[22] Filed: Jan. 27, 1978
[51] Int. Cl.² .......................................... A47C 7/54
[52] U.S. Cl. .................... 297/417; 297/411; 403/116
[58] Field of Search ................ 248/118–118.5; 297/160–162, 335, 411, 414–417; 403/91, 103, 116, 119

[56] References Cited

U.S. PATENT DOCUMENTS

| | | | |
|---|---|---|---|
| 1,671,862 | 5/1928 | Heinz | 248/118 X |
| 2,592,702 | 4/1952 | Sprung | 297/417 |
| 2,659,423 | 11/1953 | Haley | 297/414 |
| 3,197,254 | 7/1965 | Hendrickson | 297/411 |
| 3,634,925 | 1/1972 | Van Loo | 297/411 X |
| 3,968,992 | 7/1976 | Hogan | 297/162 |

FOREIGN PATENT DOCUMENTS

| | | | |
|---|---|---|---|
| 2315241 | 6/1975 | France | 297/417 |

*Primary Examiner*—James C. Mitchell
*Attorney, Agent, or Firm*—Herbert E. Haynes, Jr.

[57] ABSTRACT

A folding arm rest for attachment to individually mounted seats of the type commonly provided in automotive and marine vehicles. The arm rest includes an elongated strap secured beneath the seat so as to extend laterally therefrom. An upstanding standard is carried on the extending end of the strap and an arm rest is foldably carried atop the standard.

8 Claims, 9 Drawing Figures

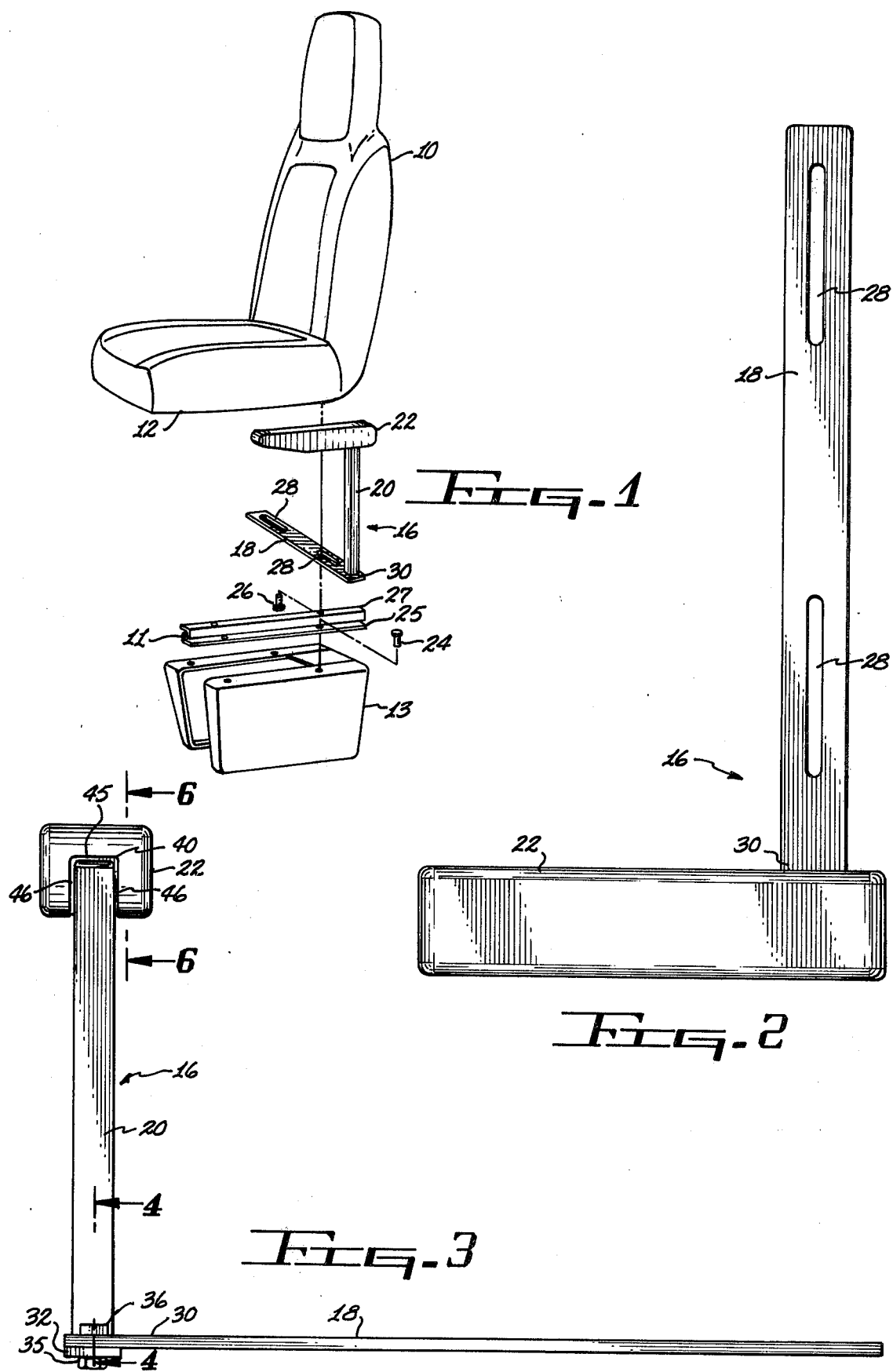

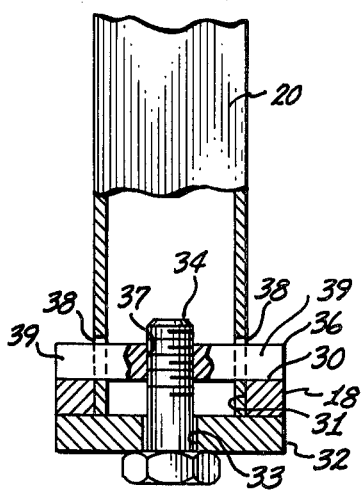
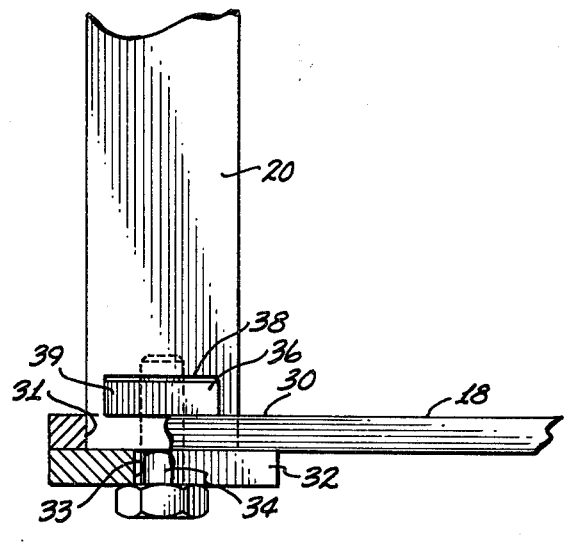
FIG-4
FIG-5
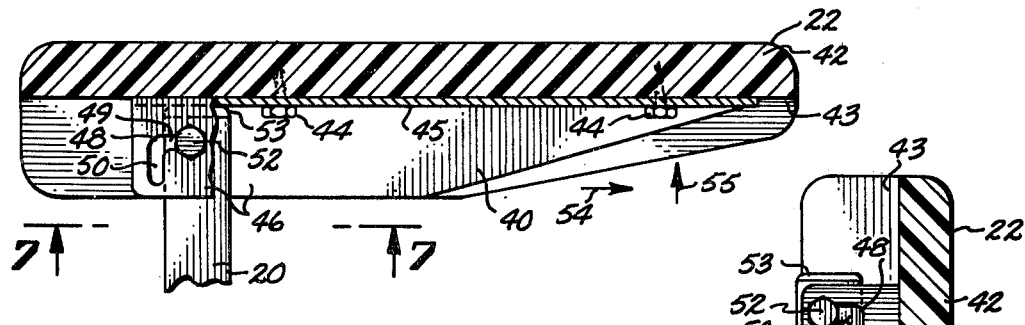
FIG-6
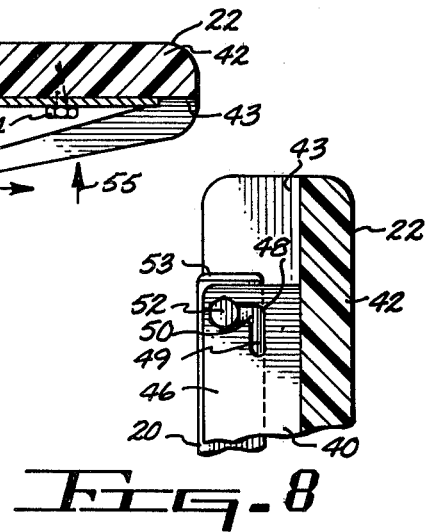
FIG-8
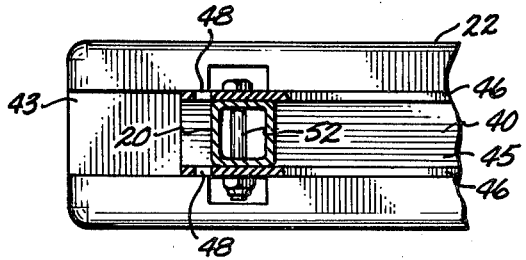
FIG-7
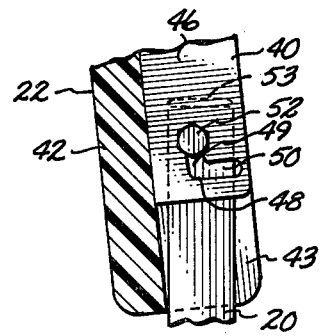
FIG-9

FOLDING ARM REST ACCESSORY

BACKGROUND OF THE INVENTION

1. Field of the Invention

This invention relates to an arm rest for use with individually mounted seats of the type provided in many automotive and marine vehicles, and more particularly to a folding arm rest accessory for attachment to such seats.

2. Description of the Prior Art

It has been a common practice for many years to provide some types of vehicles with individually mounted seats which are oftentimes referred to as bucket seats. Such vehicles include sports cars and some types of boats. In addition to these more or less traditional vehicles, specialty vehicles have been devised in recent years and have become very popular. Such specialty vehicles, including vans, mini motor homes, four-wheel drive vehicles and others, and the above described traditional vehicles come equipped with the individually mounted or bucket seats, and these seats are usually not provided with any arm rests.

A purchaser of many types of traditional or specialty vehicles can obtain, upon special order, upgraded seats which have arm rests built as an integral part of the frame. These arm rests on upgraded seats are fixed, i.e., they cannot be folded out of the way, therefore, the seats are usually mounted on a swivel base to facilitate occupant access to and from the seat. Such upgraded seats, due to the built-in arm rests and swivel mount are relatively expensive and thus many purchasers pass up such a factory option, or subsequently buying from an accessory store.

Accessory arm rests for bolt-on affixation to seats have been devised and such have not been commercially successful for various reasons. One prior art accessory arm rest known to me is bolted beside the individually mounted seat and includes a scissor-like mechanism by which the arm rest is raised and lowered. That arm rest was unsuccessful due to the bulk, complexity, and unsightly appearance of the scissor mechanism, the need for a relatively complex and hard to operate position locking device, pinching of the seat material, occupant's clothing and the occupant himself.

In addition to the above considerations, accessory arm rests of the instant type have inherent design and manufacturing problems. First, to be commercially successful, the arm rest accessory must be capable of being easily attached to a large variety of seat types such as would normally occur between different manufacturers of the same basic type of seat, and such an arm rest should preferrably move with the seat when positioning adjustments are made thereto. Secondly, to cut tooling, packaging, and other related costs, it is preferred that a single arm rest can be adapted to serve as the right arm rest on the driver's seat and the left arm rest on the passenger's seat. To the best of my knowledge, no single prior art device has been devised which satisfies these desirable conditions.

Therefore, a need exists for a new and improved folding arm rest accessory which overcomes some of the problems and shortcomings of the prior art.

SUMMARY OF THE INVENTION

In accordance with the present invention, a new and improved folding arm rest accessory is provided for bolt-on affixation to individually mounted or bucket seats, of the type commonly provided in many traditional and specialty vehicles such as sports cars, boats, vans, mini motor homes, four-wheel drive vehicles, and others. The arm rest of the present invention includes an elongated strap member which is bolted between the bottom of the seat at the rear portion thereof and the base pedestal upon which the seat is supported, and is mounted in such a way so as to provide a laterally extending end upon which an upstanding standard is mounted. An arm rest member is pivotably coupled to the uppermost end of the standard and is movable between a locked normally extending position and a folded retracted position.

The elongated strap member can be attached to the seat so as to move with the seat when adjustments in the position thereof are made, and can be adapted so as to extend laterally from either side of the seat. The standard is coupled to the strap member by means of a special coupling means which allows reversible orientation of the standard. The particular configurations of the strap member, standard, and coupling means thereof allows the arm rest accessory to be employed as either the right hand or left hand arm rest for all known individually mounted or bucket seats of the type described above, and the lockable foldable arm rest member provides a simple means for moving the arm rest member out of the way when not in use and to provide ease of occupant access to and from the seat.

Accordingly, it is an object of the present invention to provide a new and improved folding accessory arm rest which is simple to install, simple to use, and is inexpensive to manufacture.

Another object of the present invention is to provide a new and improved arm rest for use with individually mounted or bucket seats of the type commonly provided in many traditional and specialized vehicles.

Another object of the present invention is to provide a new and improved arm rest accessory for attachment to individually mounted or bucket seats of the type described above and which may be adapted for use as either a right hand or a left hand arm rest.

Another object of the present invention is to provide a new and improved arm rest accessory of the above described type which is foldable to a retracted position at the side and rear of the seat.

Another object of the present invention is to provide a new and improved folding arm rest accessory which may be attached to an individually mounted or bucket seat so as to move with the seat when repositioning adjustments are made thereto.

Another object of the present invention is to provide a new and improved folding arm rest accessory of the above described character which includes an elongated strap member for attachment between the seat and the seat supporting pedestal, the strap has a standard reversibly mounted thereon and an arm rest member is carried on the uppermost end of the standard and is pivotably movable between a locked normally extending position and upwardly or downwardly folded retracted positions.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective exploded view of a typical type of seat assembly to which the folding arm rest accessory of the present invention is attachable, and this figure shows the arm rest accessory in its position relative to the seat assembly.

FIG. 2 is an enlarged plan view of the folding arm rest accessory of the present invention.

FIG. 3 is a rear elevational view of the folding arm rest accessory of the present invention.

FIG. 4 is an enlarged fragmentary sectional view taken along the line 4—4 of FIG. 3, and is partially broken away to show the structural details.

FIG. 5 is a fragmentary side elevational view of the structure shown in FIG. 4, and is partially broken away to show the structural details thereof.

FIG. 6 is an enlarged fragmentary sectional view taken along the line 6—6 of FIG. 3.

FIG. 7 is a sectional view taken along the line 7—7 of FIG. 6.

FIG. 8 is a fragmentary sectional view similar to FIG. 6 and showing the arm rest member and related structures in the downwardly folded position thereof.

FIG. 9 is a fragmentary sectional view similar to FIG. 6 and showing the arm rest member in the upwardly folded position thereof.

DESCRIPTION OF THE PREFERRED EMBODIMENT

Referring more particularly to the drawings, FIG. 1 illustrates a typical type of individually mounted or bucket seat 10, of the kind often provided in many automotive and marine vehicles. In most installations, the seat 10 is provided with a pair of guide tracks 11 (one shown) which allow the seat 10 to be adjusted for and aft to suit particular occupant preferences. The guide tracks 11 (one shown) are bolted to the bottom 12 of the seat 10 and are also bolted to the top of a seat supporting pedestal 13.

It is to be understood that the seat 10, guide tracks 11 and pedestal 13 shown in FIG. 1 are merely exemplary of such structures, and in actuality such structures may vary as to the operation, design details, and physical appearance thereof. For example, the seat supporting pedestal 13 is of the fixed type, and many seats in common use today are supported on swivel bases (not shown), and some seats are completely fixed, i.e., they are supported on fixed pedestals such as the one shown, and are not provided with the guide tracks 11 (one shown).

In any event, FIG. 1 also illustrates the folding arm rest accessory of the present invention which is indicated in its entirety by the reference numeral 16. As will hereinafter be described in detail, the arm rest 16 includes the basic elements of an elongated mounting strap 18, an upstanding standard or post 20, and a folding arm rest member 22.

To attach the folding arm rest accessory 16 to the seat 10, the four bolts 24 (one shown) are removed to free the lower flanges 25 (one shown) of the guide tracks 11 (one shown) from the pedestal 13. This allows the seat 10 to be lifted off the pedestal 13. Then, the four bolts 26 (one shown) are removed to free the upper flanges 27 (one shown) of the guide tracks 11 (one shown) from the bottom 12 of the seat 10. This disassembly sequence is then reversed with the elongated mounting strap 18 interposed between the upper flanges 27 (one shown) of the guide tracks 11 (one shown) and the bottom 12 of the seat 10. Thus, the folding arm rest accessory 16 will be seen to be fast with the bottom 12 of the seat 10 and will therefore move when the seat 10 is adjusted fore and aft.

As seen best in FIG. 2, the elongated mounting strap 18 is provided with an aligned pair of elongated apertures 28 through which the two rearmost bolts 26 (one shown) pass to affix the strap 18 to the seat bottom 12. The apertures 28 are elongated so as to align with differing locations of the bolts of different types of seats and to allow lateral adjustment of the folding arm rest assembly 16 relative to the seat 10.

When attached to the seat 10 as described above, the elongated mounting strap 18 has a laterally extending end 30 on which the upstanding standard or post 20 is supported. The standard 20 is of square tubular configuration and may be fixedly attached to the extending end 30 of the strap 18 such as by welding (not shown). However, it is preferred that the standard 20 be demountably attached to the strap 18 so as to allow the folding arm rest accessory 16 to be adapted to serve as a right hand or left hand arm rest as will hereinafter be described in detail.

As seen best in FIGS. 3, 4 and 5, demountable attachment of the post or standard 20 to the strap 18 is accomplished by providing the strap 18 with a square aperture 31 in the extending end 30 thereof into which the lower end of the standard 20 is positioned so as to be in abutting engagement with a spacer 32 that is positioned in contiguous engagement with the lower surface of the strap 18 immediately below the square aperture provided in the extending end 30 thereof. The spacer 32 is formed with an aperture 33 centrally thereof through which the threaded shank 34 of a bolt 35 passes upwardly into the interior of the standard 20 for threaded engagement with a special nut 36 carried adjacent the lower end of the standard 20. The nut 36 is of special configuration in that it is an elongated flat plate having a threaded bore 37 formed therein. The nut 36 is carried in a pair of aligned square openings 38 formed in opposed side surfaces of the post 20 so that the opposite ends 39 of the nut 36 extend normally therefrom. The square openings 38 are formed in the lower end of the post 20 so as to be spaced from the end a distance which is substantially equal to the thickness of the elongated mounting strap 18, which places the extending ends 39 of the nut 36 in abutting engagement with the upper surface of the strap when the standard 20 is assembled to the strap as described above. Thus, with the spacer 32 in abutting engagement with the lower surface of the strap 18 and the opposite ends 39 of the nut 36 in abutting engagement with the upper surface of the strap 18, it will be seen that the mounting strap will be demountably and firmly held therebetween when the bolt 35 is tightened.

The above described combination of especially configured components, i.e., the nut 36, square aperture 31 formed in the strap 18, the spacer 32 and bolt 35, provide means for demountably coupling the standard 20 to the extending end 30 of the mounting strap 18. Other demountable coupling means could be employed to accomplish the same purpose, for example, a nut (not shown) could be fixedly mounted such as by welding into the interior of the standard 20, and oppositely extending ears (not shown) could be provided on the exterior of the standard 20 to serve the same purpose as the extending opposite ends 39 of the nut 36.

As seen best in FIGS. 6–9, the arm rest member 22 is an elongated structure of substantially square cross sectional configuration and is of suitable length and width to provide support for a person's arm. The arm rest member 22 is preferably fabricated with a U-shaped metallic channel 40, which is disposed to open downwardly when the arm rest member 22 is in its normally extended position as shown in FIG. 6. The metallic channel 40 acts as a supporting beam for an arm rest body portion 42. The arm rest body portion 42 is formed with a longitudinally extending groove 43 into which the U-shaped metallic channel 40 is nestingly positioned, with the body portion 42 being affixed to the channel such as by screws 44.

The arm rest body portion 42 may be fabricated in any of several well known manners, and for purposes of illustration and completeness this disclosure is shown as a molded structure formed of a suitable plastic material such as polyurethane. By way of example, an alternate fabrication technique which could be employed would be to construct a suitable frame (not shown) such as of wood, affix a suitable padding (not shown), such as of sponge rubber, to the frame and cover the padding and frame with an upholstering material (not shown) such as vinyl.

As hereinbefore mentioned, the elongated metallic channel 40 is of U-shaped cross sectional configuration and is therefore, provided with a bight portion 45 and a spaced pair of parallel side flanges 46. The side flanges 46 are each provided with an inverted L-shaped aperture 48 formed therethrough, with each aperture 48 disposed in its respective one of the flanges 46 to provide a first or longitudinally extending component 49, and a second or transversely extending component 50. The L-shaped apertures 48 are disposed adjacent one end of their respective ones of the side flanges 46 and are disposed therein in transverse alignment with respect to each other. A pivot pin means in the form of a bolt 52 is loosely carried in the L-shaped apertures 48 with the pivot bolt 52 also passing through the uppermost end of the upstanding post 20. The pivot pin 52 and L-shaped apertures 48 assembled as described above, accomplishes the pivotable mounting of the arm rest member 22 to the upper end of the standard or post 20, and the particular configuration of the apertures 48 results in the arm rest member 22 being lockable in its normally extended position as will now be described.

As seen in FIG. 6, with the arm rest member 22 positioned so that the pivot bolt 52 is located in the forward ends of the longitudinally extending components 49 of the apertures 48, the top 53, of the post 20 is held in frictional bearing engagement with the bight portion 45 of the channel 40, and the arm rest member will thus be located in its extending position due to that frictional bearing engagement.

To move the arm rest 22 from the normally extending position shown in FIG. 6 to the downwardly folded position as shown in FIG. 8, the arm rest member 22 is first moved in the direction of arrow 54 (FIG. 6) which relocates the pivot bolt 52 at the junction of the longitudinal and transverse components 49 and 50 of the apertures 48. Subsequent movement of the arm rest member 22 in the direction of arrow 55 (FIG. 6) will move the pivot bolt 52 to the lower ends of the transverse components 50 of the apertures 48 and will simultaneously raise the bight portion 45 away from the top 53 of the post 20. When in this position, the arm rest member 22 is free and may be pivotably moved to the downwardly folded position shown in FIG. 8.

As shown in FIG. 9, the arm rest member 22 may also be pivotably moved to an upwardly folded position if desired. To accomplish such upwardly folded positioning the arm rest member 22 is moved, as described above, to relocate the pivot bolt 52 at the junction of the longitudinal and transverse components 49 and 50 of the apertures 48. The arm rest member 22 is then lifted, also as described above, to relocate the pivot bolt in the lower end of the transverse components 50 of the apertures 48. With the bolt 52 thus located, the arm rest member 22 is pivoted upwardly to the position shown in FIG. 9, and gravity will move the arm rest member 22 so that the pivot bolt 52 will end up in the longitudinally extending components 49 of the apertures 48 and will thus be locked in that position due to the close proximity of the bight portion 45 with respect to the adjacent side surface and top 53 of the post 20.

Thus, the arm rest member 22 is pivotally coupled to the uppermost end of the upstanding standard or post 20, by complemental elements of a pivotable connection, i.e., the L-shaped apertures 48 and the pivot bolt 52, with those complemental elements allowing the arm rest member 22 to be lockable held in its normally extending position, and to be pivotably moved to either a downwardly or an upwardly folded position.

With the arm rest member 22 pivotably coupled to the post 20, and the post 20 coupled to the mounting strap 18 as described above, it will be seen that the folding arm rest accessory 16 is adapted to serve as a left hand arm rest for the seat 10, as seen in FIG. 1. The folding arm rest accessory 16 may be easily reconfigured to serve as a right hand arm rest by simply decoupling the post 20 from the mounting strap 18, rotating it 180° about its longitudinal axis, and reconnecting it in this rotated position to the mounting strap 18. Such rotational repositioning of the post 20 will, of course, also rotate the arm rest member 22 so that it will extend from the post 20 in a direction opposite to that shown in the drawings. Thus, in that reconfigured position, the folding arm rest accessory 16 can be mounted so as to extend laterally from the right hand side of the seat 10.

It will be appreciated that the folding arm rest accessory 16 as described above is ideally suited for use in vehicular installations. However, the arm rest 16 can be employed in non-vehicular installations. Further, the arm rest accessory 16 is shown and described as either a right hand or a left hand unit, and it would be obvious in view of this disclosure that the arm rest could be fabricated into one that provides an arm rest on both sides of a seat. To accomplish fabrication of such an arm rest (not shown), the mounting strap 18 would be lengthened so as to extend from both sides of the seat, and a standard 20 having a folding arm rest member 22 mounted thereon is carried on each of the opposite ends of the mounting strap.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A folding arm rest for attachment to an individually mounted vehicular seat comprising:

(a) an elongated mounting strap for attachment to the bottom of the individually mounted seat, said strap having at least one of its ends extending laterally from the individually mounted seat when said strap is attached thereto;

(b) an upstanding standard supported on the extending end of said mounting strap;

(c) an arm rest member; and (d) means for pivotably mounting said arm rest member to the uppermost end of said standard, said means adapted to allow said arm rest member to be selectively moved relative to said standard between a downwardly folded position, an upwardly folded position and a locked normally extending position.

2. A folding arm rest as claimed in claim 1 wherein said standard is demountably supported on the extending end of said elongated mounting strap to allow repositioning thereof so that said folding arm rest can be selectively configured as a right hand or left hand arm rest.

3. A folding arm rest as claimed in claim 1 and further comprising means for demountably coupling said standard to the extending end of said elongated mounting strap to allow said standard to be repositioned thereon.

4. A folding arm rest as claimed in claim 3 wherein said means for demountably coupling sid standard comprises:

(a) said standard of substantially square tubular configuration with a pair of openings aligningly formed in opposite side surfaces adjacent the downwardly disposed end thereof;

(b) a nut having a threaded bore formed therein, said nut located in the downwardly disposed end of said standard and of substantially flat configuration with its opposite ends each extending through a different one of the openings of said standard;

(c) said elongated mounting strap having a substantially square aperture formed through the extending end thereof for receiving the downwardly disposed end of said standard in a manner which places the opposite ends of said nut in bearing engagement with the upper surface of said mounting strap;

(d) a spacer having an aperture formed therethrough, said spacer in bearing engagement with the lower surface of said elongated mounting strap immediately below the square aperture thereof; and (e) bolt means having a threaded shank which passes upwardly through the aperture of said spacer into threaded engagement with the threaded bore of said nut.

5. A folding arm rest as claimed in claim 1 wherein said arm rest member comprises:

(a) an elongated metallic channel of U-shaped cross section and having a bight portion and a spaced pair of parallel flanges;

(b) an arm rest body means having a longitudinally extending U-shaped groove formed therein; and (c) said elongated U-shaped channel nestingly affixed within the U-shaped groove formed in said arm rest body means.

6. A folding arm rest as claimed in claim 5 wherein said arm rest body means is fabricated of plastic which is formed into an elongated structure of substantially square cross sectional configuration.

7. A folding arm rest as claimed in claim 1 wherein said elongated mounting strap is provided with at least a pair of apertures formed therethrough by which said mounting strap is attachable to the individually mounted seat, said apertures being elongated to provide means for laterally adjusting said mounting strap relative to the individually mounted seat when said mounting strap is attached thereto.

8. A folding arm rest as claimed in claim 1 wherein said means for pivotably mounting said arm rest member to the uppermost end of said standard comprises:

(a) said arm rest member having a bottom from which a spaced pair of parallel flanges extend with an aligned pair of inverted L-shaped apertures each formed through a different one of said flanges, said flanges disposed so that said pair of apertures are each located adjacent a different opposite side of said standard adjacent the uppermost end thereof, each of said apertures having a longitudinally extending component and a transversely extending component; and (b) pivot pin means passing through said pair of apertures and passing through said standard adjacent the uppermost end thereof, said pivot pin means being a relatively loose fit in said pair of apertures to allow said arm rest member to be slidably and pivotably moved relative to said pivot pin means into the downwardly folded position in which said pivot pin means passes through the transverse components of said pair of of apertures with the bottom of said arm rest member in engagement with one side of said standard, into the upwardly folded position wherein said pivot pin means passes through the longitudinal components of said pair of apertures with the bottom of said arm rest member in engagement with the opposite side of said standard, and into the locked normally extending position wherein said pivot pin means passes through the longitudinal components of said pair of apertures with the bottom of said arm rest member in engagement with the top of said standard.

* * * * *